United States Patent
Yang et al.

(10) Patent No.: US 9,685,792 B2
(45) Date of Patent: Jun. 20, 2017

(54) MAGNETIC FIELD DISTRUBTION IN WIRELESS POWER

(71) Applicant: INTEL CORPORATION, Santa Clara, CA (US)

(72) Inventors: Songnan Yang, San Jose, CA (US); Janardhan Koratikere Narayan, Fremont, CA (US); Anand Konanur, Sunnyvale, CA (US); Jonathan Rosenfeld, Portland, OR (US); Sreenivas Kasturi, Hillsboro, OR (US); Kwan Ho Lee, Mountain View, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 14/197,598

(22) Filed: Mar. 5, 2014

(65) Prior Publication Data

US 2015/0255987 A1    Sep. 10, 2015

(51) Int. Cl.
*H01F 27/42* (2006.01)
*H02J 5/00* (2016.01)
(Continued)

(52) U.S. Cl.
CPC .............. *H02J 5/005* (2013.01); *H01F 27/28* (2013.01); *H01F 38/14* (2013.01); *H02J 7/025* (2013.01); *H02J 17/00* (2013.01); *Y10T 29/4902* (2015.01)

(58) Field of Classification Search
CPC ..... Y10T 29/4902; H01F 27/28; H01F 38/14; H02J 17/00; H02J 5/005; H02J 7/025
(Continued)

(56) References Cited

U.S. PATENT DOCUMENTS

2009/0134712 A1* 5/2009 Cook .................. H02J 5/005 307/104
2011/0281535 A1* 11/2011 Low .................... H02J 7/025 455/129

(Continued)

FOREIGN PATENT DOCUMENTS

CN  103339824 A  10/2013
CN  103534772 A  1/2014
(Continued)

OTHER PUBLICATIONS

Taiwan Search Report for TW Application No. 104103421, date of completion Nov. 6, 2015, 2 pages.
(Continued)

*Primary Examiner* — Jared Fureman
*Assistant Examiner* — Duc M Pham
(74) *Attorney, Agent, or Firm* — International IP Law Group, P.L.L.C.

(57) ABSTRACT

Techniques of magnetic field distribution are described herein. The techniques may include forming a wireless charging component including a driving coil to receive a driven current generating a magnetic field. An outer turn of a parasitic coil may be formed, wherein the outer turn is adjacent to the driving coil. An inner turn of the parasitic coil may be formed, wherein an inductive coupling between the driving coil and the parasitic coil generates a redistribution of a portion of the magnetic field at the inner turn.

29 Claims, 9 Drawing Sheets

100A

100B

(51) Int. Cl.
*H01F 27/28* (2006.01)
*H01F 38/14* (2006.01)
*H02J 7/02* (2016.01)
*H02J 17/00* (2006.01)

(58) Field of Classification Search
USPC .......................................................... 307/104
See application file for complete search history.

(56) References Cited

U.S. PATENT DOCUMENTS

2012/0161696 A1    6/2012  Cook et al.
2012/0267960 A1   10/2012  Low et al.
2014/0125275 A1*  5/2014  Low ..................... H04B 5/0093
                                                           320/108
2015/0115727 A1*  4/2015  Carobolante ........... H02J 5/005
                                                           307/104

FOREIGN PATENT DOCUMENTS

| JP | 2012244763 A | 10/2012 |
| JP | 2013140859 A | 7/2013 |
| JP | 2013534074 A | 8/2013 |
| TW | 201336199 A | 9/2013 |
| WO | 2013113017 A1 | 8/2013 |

OTHER PUBLICATIONS

CN Search Report, CN Application No. 201510059696.X, dated Sep. 1, 2016, 1 page.

* cited by examiner

100A

100B

104

300

400

US 9,685,792 B2

MAGNETIC FIELD DISTRUBTION IN WIRELESS POWER

TECHNICAL FIELD

This disclosure relates generally to techniques for wireless charging. Specifically, this disclosure relates to achieving a desired distribution of a magnetic field associated with a wireless charging component.

BACKGROUND ART

Magnetic resonance wireless charging may employ a magnetic coupling between a transmit (Tx) coil and a receive (Rx) coil. A common issue seen in these types of wireless charging systems is a non-uniform distribution of power delivered to the Rx coil as it is moved to various dispositions in a plane parallel to a plane of a Tx coil surface. In this scenario, a non-uniform power distribution received at the Rx coil may be due to a non-uniform magnetic field. The variation of the magnetic field may be especially pronounced when the Tx and Rx coils are closer together.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for creating a certain distribution of magnetic field in a wireless power transfer system. As discussed above, magnetic resonance wireless charging systems may employ a magnetic coupling between a transmit (Tx) coil and a receive (Rx) coil. Non-uniform power transfer distribution may be due to variations occurring in the magnetic field associated with the Tx coil, for example. The techniques described herein include a driving coil and a parasitic coil, wherein the parasitic coil is configured to inductively couple to the driving coil, and redistribute a magnetic field associated with the coil to a disposition that is based on the geometry of the parasitic coil.

Figure 1A:
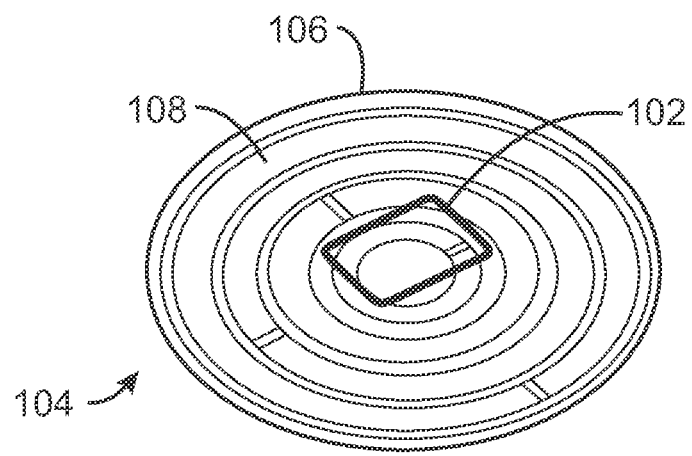
FIG. 1A is perspective view of a diagram illustrating a device to be wirelessly coupled a transmitting coil having a driving coil and multiple parasitic coils.

FIG. 1A is perspective view of a diagram illustrating a device to be wirelessly coupled to a transmitting coil having a parasitic coil and a driving coil. As illustrated in FIG. 1, a device 102 may be placed on a Tx coil 104. The coil may include a driving coil 106 and one or more parasitic coils 108. As discussed in more detail below, the Tx coil 104 may have a magnetic field associated with a current injected into the driving coil 106. The parasitic coil 108 may redistribute the magnetic field in a configurable manner based on the width of the parasitic coil.

In some aspects, the wireless Tx coil 104 may be used in a wireless charging system wherein the device 102 may be charged by inductive coupling between the Tx coil 104 and a Rx coil (not shown) in the device 102. In some aspects, the wireless Tx coil 104 may be used in near-field communication wherein the Tx coil 104 transmits near field radio signals to a Rx coil in the device 102 via magnetic induction.

Figure 1B:
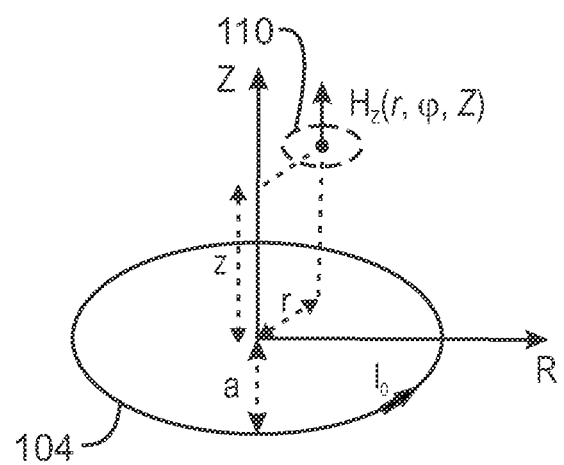
FIG. 1B is coordinate system for the transmitting coil of FIG. 1A.

FIG. 1B is coordinate system for the transmitting coil of FIG. 1A. The "Z" direction is perpendicular to a horizontal plane of the Tx coil 104, and is perpendicular to the "R" direction indicated in FIG. 1B. The variable "r" is a scalar number representing a distance from a center point of the Tx coil 104 to a Rx coil 110, while the variable "a" is a radius of the Tx coil 104. The variable "z" is a scalar number representing the distance in the "Z" direction between the Rx coil 110 and the Tx coil 104. The Z direction magnetic field received by the Rx coil 110 is represented by "$H_z$" and, as indicated in FIG. 1, is a function of the distance from the center point of the Tx coil 104 to the Rx coil 110. Variation of $H_z$ may result in a variation in the power received at the Rx coil 110. In the aspects described herein, the magnetic field $H_z$ may be redistributed by the parasitic coil 108 as discussed in more detail below.

Figure 2:
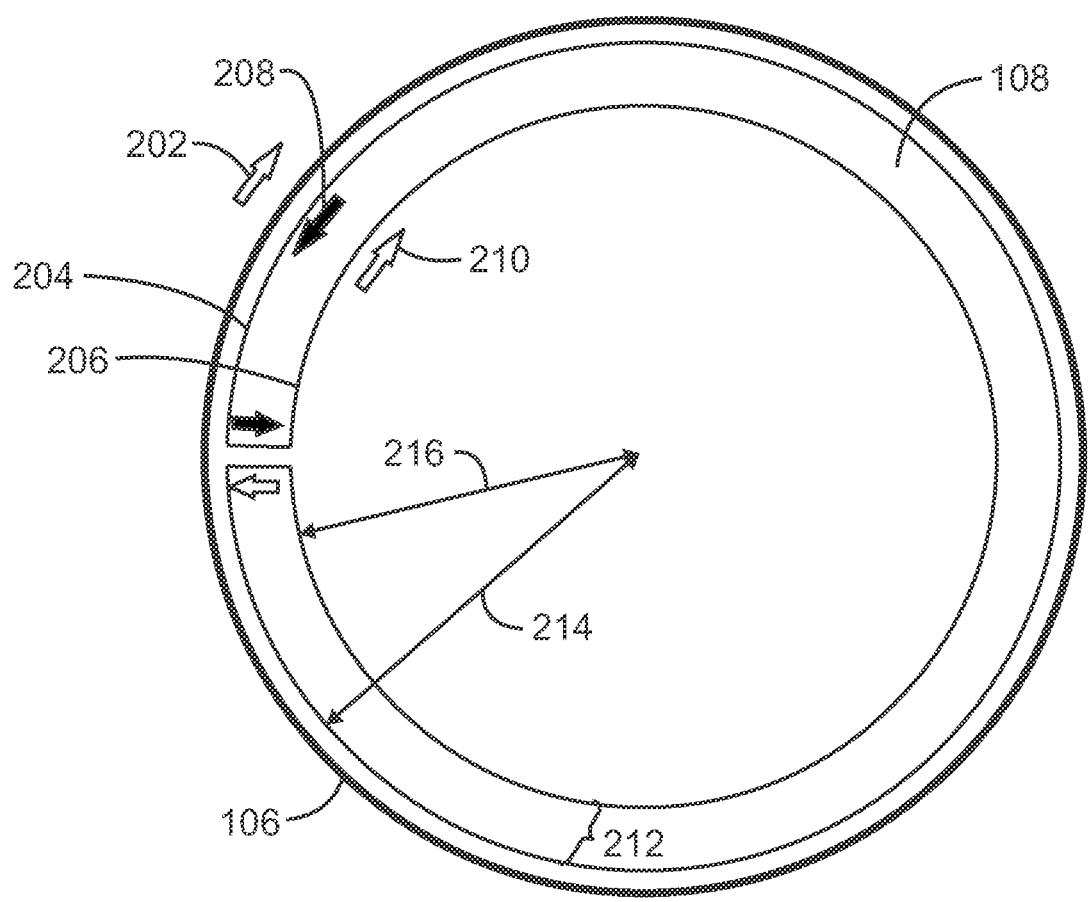
FIG. 2 is top view of a diagram illustrating a wireless transmitting component having a parasitic coil and a driving coil.

FIG. 2 is top view of a diagram illustrating a wireless transmitting component having a parasitic coil and a driving coil. The wireless transmitting component of FIG. 2 may be a Tx coil, such as the Tx coil 104 in FIG. 1. As illustrated in FIG. 1, the Tx coil 104 includes the driving coil 106 and the parasitic coil 108. The driving coil 106 may be driven by a current "$I_0$" propagating in a first direction as indicated by the arrow 202. The parasitic coil 108 may include an outer turn 204 and an inner turn 206. The outer turn 204 may inductively couple to the driving coil 106 as a result of the current $I_0$. The inductive coupling between the driving coil 106 and the outer turn 204 may result in a current "$\alpha I_0$" propagating in a direction opposite to the direction 202 driving current $I_0$ as indicated by the arrow 208. As the current "$\alpha I_0$" reaches the inner turn 206 of the parasitic coil, the current is propagating in a direction similar to the direction of the driving current $I_0$ as indicated by the arrow 210. In this scenario, $\alpha$ is a fraction, such that a resulting magnetic field associated with the current $\alpha I_0$ traveling in the direction 210 is a fraction of the original driving current $I_0$. The magnitude of $\alpha$ is related to the width of the parasitic coil indicated at 212 in FIG. 2. For example, the width 212 of the parasitic coil may be defined by the difference between a radius 214 of the outer turn 204 and a radius 216 of the inner turn 218. While FIG. 2 illustrates one parasitic coil 108 and one driving coil 106, multiple parasitic coils may be used to further redistribute the magnetic field of the driving coil, as discussed in more detail below.

Figure 3:
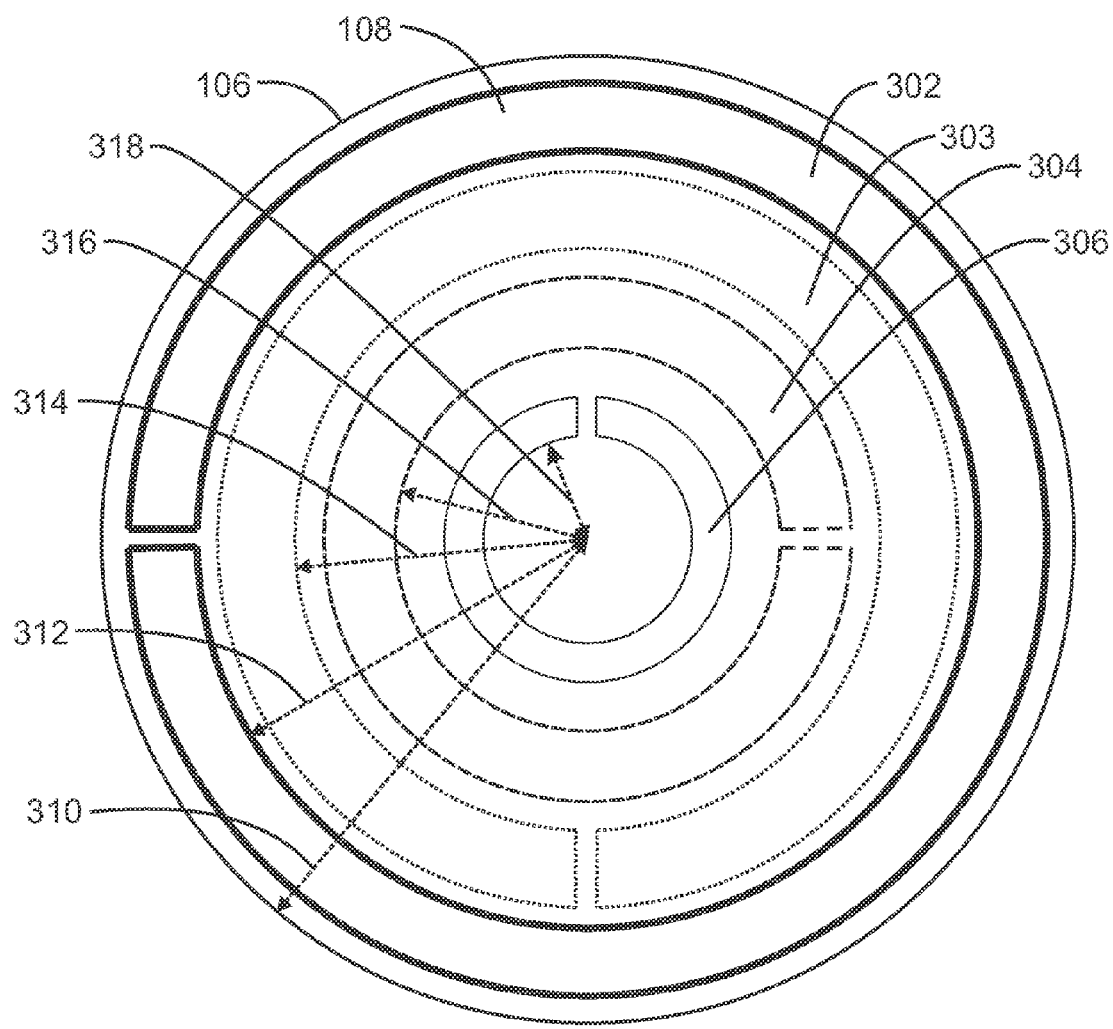
FIG. 3 is top view of a diagram illustrating a wireless charging coil having a driving coil and multiple parasitic coils.

FIG. 3 is top view of a diagram illustrating a wireless charging coil having a driving coil and multiple parasitic coils. The current associated with the driving coil 106 may be redistributed by the parasitic coil 108 as well as additional parasitic coils 303, 304, 306. As illustrated in FIG. 3, the driving coil 106 may have a radius 310, and the inner turn of the parasitic coil 108 may have a radius 312. The radius 312 may be selected based on a desired distribution of magnetic fields, or in other words, a desired redistribution of the magnetic field associated with the driving coil 106. Similarly, the radius 314 of an inner turn of the parasitic coil 303, as well as the radii 316 and 318 of the parasitic coils 304, 306, respectively, may be selected based on a desired distribution of magnetic fields as the radii become shorter.

In aspects of the present disclosure, the driving coil 106 and the parasitic coil 108 are concentric to a center point of the coil. However, the coils 106 and 108 are not necessarily concentric, but may be implemented with any suitable arrangement based on a desired magnetic field distribution. In aspects, the desired distribution of magnetic fields generates a substantially even distribution in comparison to a distribution associated with a Tx coil that does not include a parasitic coil, as discussed in more detail below in relation to FIG. 6. For example, the radii 312, 314, 316, 318 may be fractions, such as 0.8, 0.6, 0.4, and 0.2, respectively, of the radius 310 of the driving coil 106. The resulting current at each inner turn of the parasitic coils 108, 303, 304, and 306, may be 0.21 $I_0$, 0.17 $I_0$, 0.1 $I_0$, 0.05 I0, respectively. In this scenario, the current resulting at each inner turn of the parasitic coils reflects a redistribution of the original driving current $I_0$, effectively evenly distributing the magnetic field and therefore, more evenly transmitting power to a receiving coil.

Figure 4:
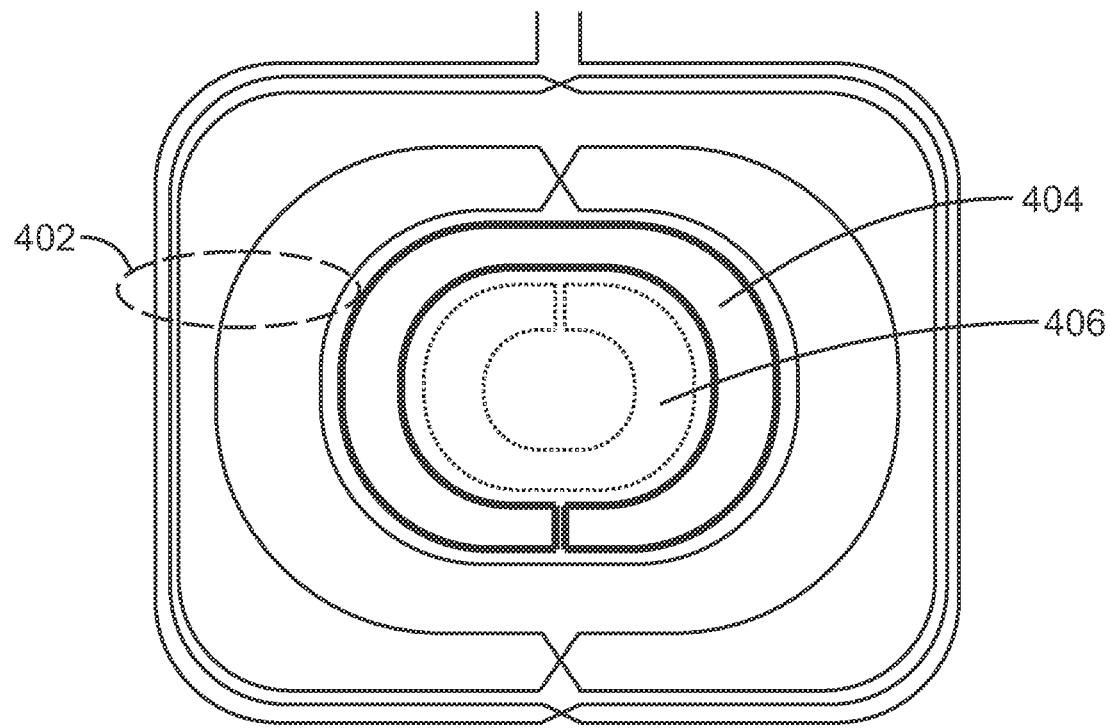
FIG. 4 is top view of a diagram illustrating a wireless charging coil having a driving coil including multiple turns and multiple parasitic coils.

FIG. 4 is top view of a diagram illustrating a wireless charging coil having a driving coil including multiple turns and multiple parasitic coils. The wireless charging coil 400 illustrated in FIG. 4 includes a driving coil having multiple turns as indicated by the dashed circle 402. In this aspect, the wireless charging coil 400 may include a first parasitic coil 404 and a second parasitic coil 406. In the aspects described herein, parasitic coils need not be circular in shape. For example, as illustrated in FIG. 4, the driving coil 402 as well as the parasitic coils 404, 406 are not perfect circles but are more oval in shape. Other shapes may be implemented according to a given design to distribute the magnetic field in a desired distribution.

Figure 5:
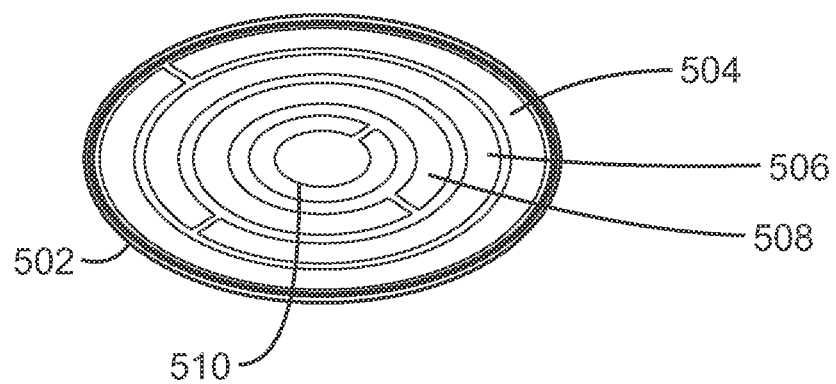
FIG. 5 is perspective view of a diagram illustrating a wireless charging coil having multiple driving coils and multiple parasitic coils.

FIG. 5 is perspective view of a diagram illustrating a wireless charging coil having multiple driving coils and multiple parasitic coils. As illustrated in FIG. 5, the aspects described herein are not limited to a single driving coil. Rather, multiple driving coils 502 may be used. One or more parasitic coils 504, 506, 508, 510 may be used to redistribute magnetic fields of the multiple driving coils 502. In aspects, the multiple driving coils 502 may be selectively implemented having similar radii or varying radii, enabling design flexibility of the Tx coil, and in choosing a coil's inductance.

Figure 6:
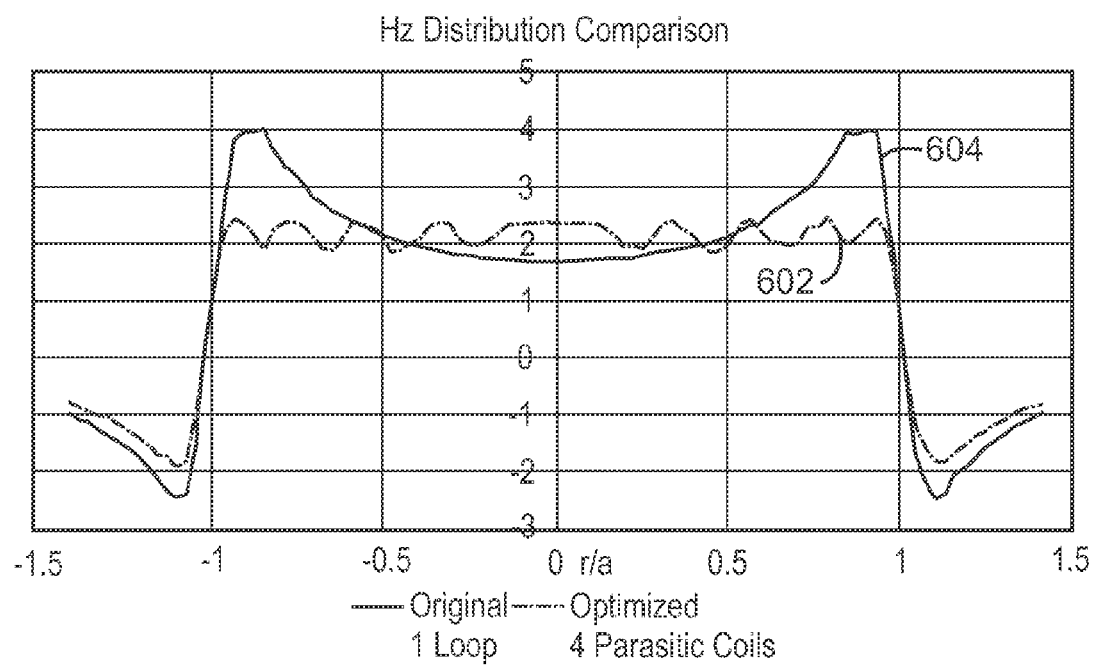
FIG. 6 is a graph illustrating a substantially even distribution of a magnetic field in relation to a magnetic field of a wireless charging component without a parasitic coil.

FIG. 6 is a graph illustrating a substantially even distribution of a magnetic field in relation to a magnetic field of a wireless charging component without a parasitic coil. As discussed above, the aspects described herein may include a redistribution of the magnetic field of a driving coil. The graph 600 illustrates a distribution 602 of a magnetic field when parasitic coils are used to redistribute the magnetic field associated with a driving coil. In comparison to the distribution 602, a distribution 604 is relatively more uneven when a coil does not include a parasitic element, such as the parasitic coils discussed above in reference to FIGS. 1-5.

Figure 7:
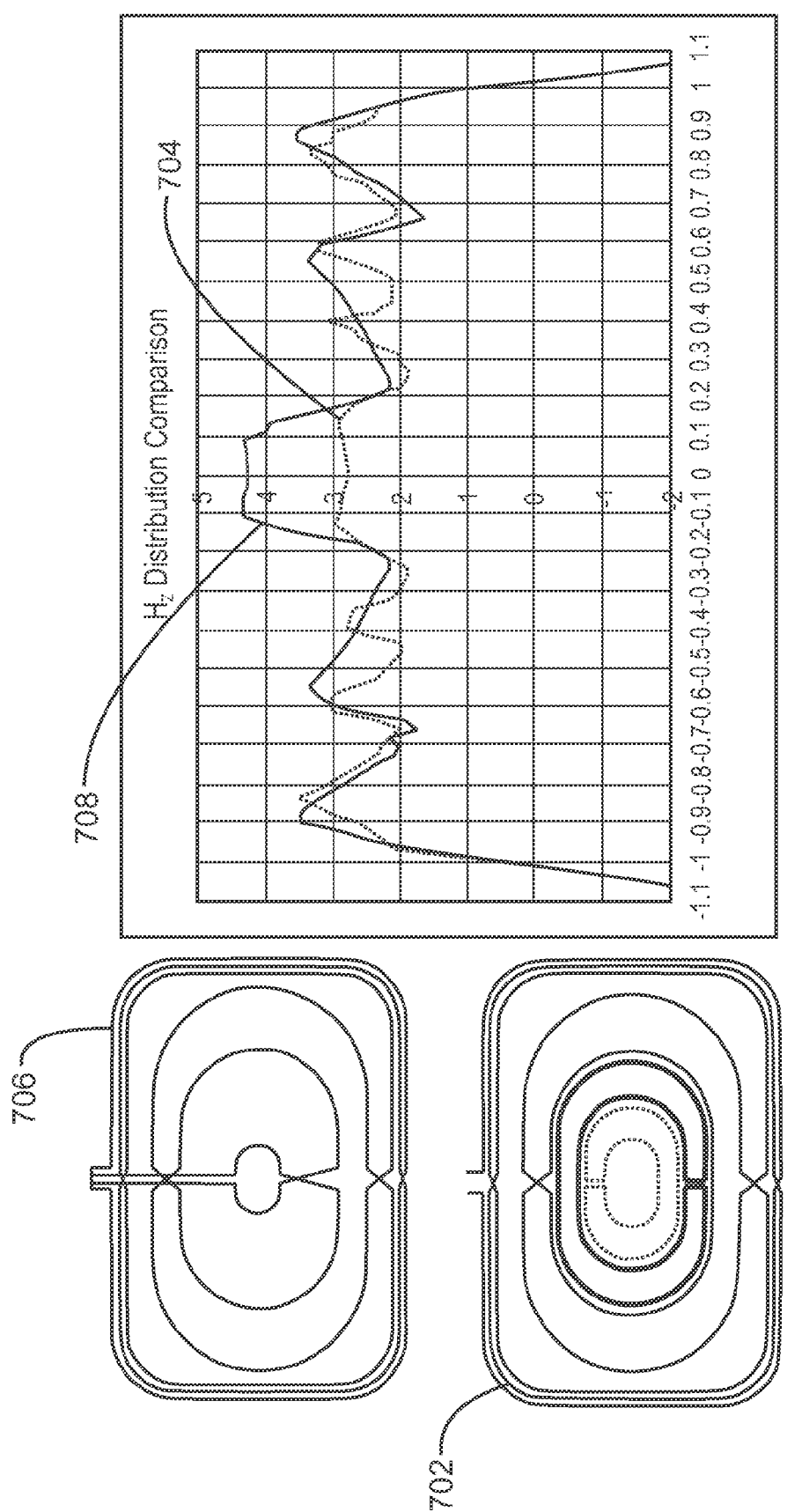
FIG. 7 is a graph illustrating a substantially even distribution of a magnetic field in relation to a magnetic field of a wireless component having multiple turns without a parasitic coil.

FIG. 7 is a graph illustrating a substantially even distribution of a magnetic field in relation to a magnetic field of a wireless component having multiple turns without a parasitic coil. As discussed above, the aspects described herein may include a redistribution of the magnetic field of a driving coil. The graph 700 illustrates a wireless component 702 having multiple turns in a driving coil as well as having one or more parasitic coils. The magnetic field distribution of the wireless component 702 is indicated by the line 704. As illustrated in FIG. 7, a wireless component 706 having multiple turns, but not having one or more parasitic coils has a magnetic field distribution, indicated by the line 708, that includes more variation in terms of magnitude than the distribution 704.

Figure 8:
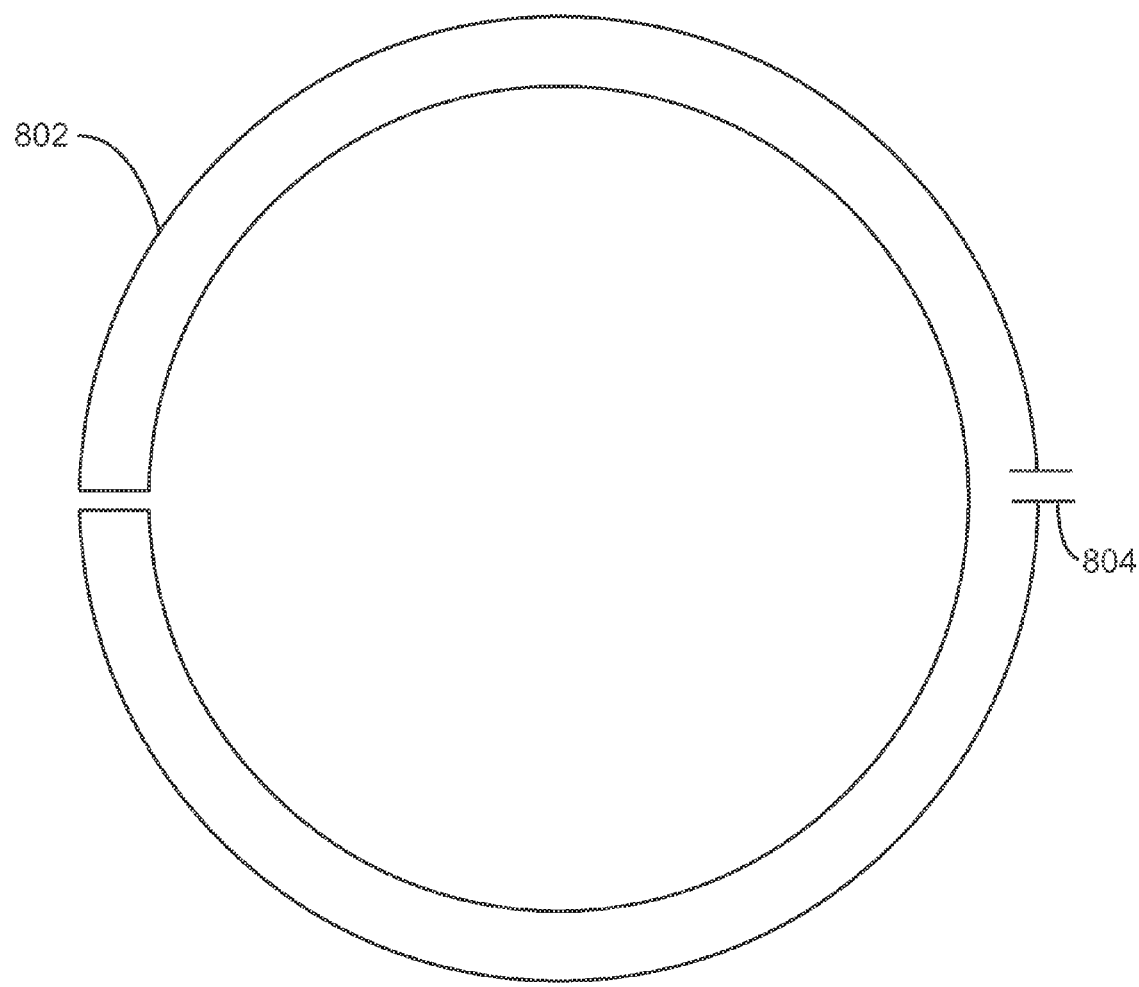
FIG. 8 is a diagram illustrating an example parasitic coil with a tuning element.

FIG. 8 is a diagram illustrating an example parasitic coil with a tuning element. A parasitic coil 802 may include a tuning element 804. As illustrated in FIG. 8, the tuning element 804 may be a capacitor. In aspects, the tuning element 804 may be configured to enable tuning flexibility of the current on the parasitic coil. For example, the parasitic coil 802 may be turned on or near a resonance frequency of a driving coil. Tuning the parasitic coil 802 on or near the resonance frequency of the driving coil may achieve more flexibility in redistribution of the current of the driving coil. The aspects illustrated in FIG. 8, may be implemented in any combination of the aspects described herein.

Figure 9:
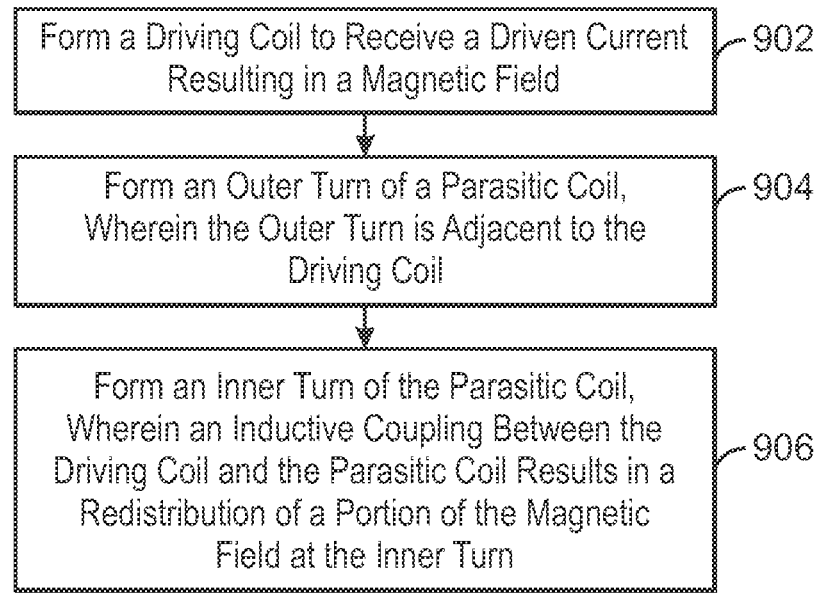
FIG. 9 is a flow diagram illustrating a method for forming a wireless charging component.

FIG. 9 is a flow diagram illustrating a method for forming a wireless charging component. The method 900 may include, forming a driving coil at block 902. The driving coil may be configured to receive a driven current resulting in a magnetic field. A parasitic coil may also be formed. At block 904, an outer turn of the parasitic coil is formed wherein the outer turn is adjacent to the driving coil. An inner turn is formed at block 906, wherein an inductive coupling between the driving coil and the parasitic coil at the outer turn generates a redistribution of a portion of the magnetic field at the inner turn.

As discussed above, the portion of the magnetic field that is redistributed to the inner turn of the parasitic coil may be based on a distance between the outer turn and the inner turn. Therefore, in some aspects, the portion that is redistributable is configurable based on the distance, and the parasitic coil may be formed based on a desired magnetic field distribution profile. For example, a substantially even distribution, such as the distribution 602 discussed above in reference to FIG. 6, may be desired such that a substantially even power distribution associated with the magnetic field distribution is achieved. In aspects, a substantially even power distribution may enable wireless charging to be relatively agnostic to the location of a receiving coil in relation to the transmitting coil.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects.

Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of forming a wireless component, comprising:
    forming a driving coil to receive a driven current generating a magnetic field;
    forming an outer turn of a parasitic coil surrounded by the driving coil, wherein the outer turn is adjacent to the driving coil and inductively coupled to the driving coil to generate a first parasitic current that is out of phase with the driven current; and
    forming an inner turn of the parasitic coil, wherein the inner turn is conductively coupled to the outer turn to generate a second parasitic current that is out of phase with the first parasitic current and in phase with the driven current.

2. The method of claim 1, wherein the parasitic coil redistributes a portion of the magnetic field of the driving coil based on a distance between the outer turn and the inner turn of the parasitic coil.

3. The method of claim 1, wherein the parasitic coil is a first parasitic coil, the method comprising forming a second parasitic coil to further redistribute the magnetic field.

4. The method of claim 3, wherein the driving coil comprises multiple turns.

5. The method of claim 3, wherein a radius of the first parasitic coil is shorter than a radius of the driving coil, and wherein a radius of the second parasitic coil is shorter than the radius of the first parasitic coil.

6. The method of claim 1, wherein the driving coil and parasitic coil are concentric in relation to a center point.

7. The method of claim 1, wherein a magnetic field distribution of the wireless component is configurable based on a disposition of the parasitic coil in relation to the driving coil.

8. The method of claim 1, wherein the parasitic coil causes a redistribution of the magnetic field of the driving coil and wherein the redistribution of the magnetic field generates a substantially even magnetic field distribution in relation to a driving coil that that is not adjacent to a parasitic coil.

9. The method of claim 1, wherein the parasitic coil causes a redistribution of the magnetic field of the driving coil and wherein the redistribution of the magnetic field is configurable based on a relative disposition of the driving coil to the parasitic coil.

10. The method of claim 1, wherein the parasitic coil comprises:
    a circular parasitic coil;
    a non-circular parasitic coil; and
    any combination of the above.

11. The method of claim 1, comprising forming a tuning element in the parasitic coil to enable tuning flexibility of the parasitic coil.

12. A wireless component, comprising:
    a driving coil to receive a driven current generating a magnetic field;
    an outer turn of a parasitic coil surrounded by the driving coil, wherein the outer turn is adjacent to the driving coil and inductively coupled to the driving coil to generate a first parasitic current that is out of phase with the driven current; and
    an inner turn of the parasitic coil, wherein the inner turn is conductively coupled to the outer turn to generate a second parasitic current that is out of phase with the first parasitic current and in phase with the driven current.

13. The wireless component of claim 12, wherein the parasitic coil redistributes a portion of the magnetic field of the driving coil based on a distance between the outer turn and the inner turn of the parasitic coil.

14. The wireless component of claim 12, wherein the parasitic coil is a first parasitic coil, the wireless component comprising a second parasitic coil to further redistribute the magnetic field.

15. The wireless component of claim 14, wherein a radius of the first parasitic coil is shorter than a radius of the driving coil, and wherein a radius of the second parasitic coil is shorter than the radius of the first parasitic coil.

16. The wireless component of claim 12, wherein the driving coil and parasitic coil are concentric in relation to a center point.

17. The wireless component of claim 12, wherein a magnetic field distribution of the wireless component is configurable based on a disposition of the parasitic coil in relation to the driving coil.

18. The wireless component of claim 12, wherein the parasitic coil causes a redistribution of the magnetic field of the driving coil and wherein the redistribution of the magnetic field generates a substantially even magnetic field distribution in relation to a driving coil that is not adjacent to a parasitic coil.

19. The wireless component of claim 12, comprising a tuning element in the parasitic coil to enable tuning flexibility of the parasitic coil.

20. The wireless component of claim 12, wherein the parasitic coil causes a redistribution of the magnetic field of the driving coil and wherein the redistribution of the magnetic field is configurable based on a relative disposition of the driving coil to the parasitic coil.

21. A wireless transmitter, comprising:
- a driving coil to receive a driven current generating a magnetic field;
- an outer turn of a parasitic coil surrounded by the driving coil wherein the outer turn is adjacent to the driving coil, and wherein an inductive coupling between the driving coil and the outer turn generates:
  - a current at the outer turn propagating in a direction opposite to a direction of the driven current in the driving coil; and
  - a reduction of the magnetic field at the driving coil; and
- an inner turn of the parasitic coil conductively coupled to the outer turn to receive the current from the outer turn, wherein current in the inner turn is propagates in a same direction as the driven current to generate a magnetic field that adds to the magnetic field of the driving coil.

22. The wireless transmitter of claim 21, wherein a magnitude of the magnetic field of the inner turn is proportional to a distance between the outer turn and the inner turn of the parasitic coil.

23. The wireless transmitter of claim 21, wherein the parasitic coil is a first parasitic coil, the wireless transmitter comprising a second parasitic coil that is smaller than the first parasitic coil.

24. The wireless transmitter of claim 21, wherein the driving coil and parasitic coil are concentric in relation to a center point.

25. The wireless transmitter of claim 21, wherein a magnetic field distribution of the wireless transmitter is configurable based on a disposition of the parasitic coil in relation to the driving coil.

26. The wireless transmitter of claim 21, wherein a distribution of the magnetic field is substantially even in relation to a driving coil that is not adjacent to a parasitic coil.

27. The wireless transmitter of claim 21, wherein a redistribution of the magnetic field is configurable based on a relative disposition of the driving coil to the parasitic coil.

28. The wireless transmitter of claim 21, comprising a tuning element in the parasitic coil to enable tuning flexibility of the parasitic coil.

29. The wireless transmitter of claim 21, wherein the parasitic coil comprises:
- a circular parasitic coil;
- a non-circular parasitic coil; and
- any combination of the above.

* * * * *